(12) United States Patent
Kaneria

(10) Patent No.: US 12,117,990 B2
(45) Date of Patent: Oct. 15, 2024

(54) ENTERPRISE DATA MANAGEMENT LOGIC CONFIGURATION

(71) Applicant: Evernorth Strategic Development, Inc., St. Louis, MO (US)

(72) Inventor: Ankur Kaneria, Cedar Park, TX (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 210 days.

(21) Appl. No.: 17/750,019

(22) Filed: May 20, 2022

(65) Prior Publication Data

US 2023/0376477 A1 Nov. 23, 2023

(51) Int. Cl.
*G06F 16/23* (2019.01)
*G06F 16/27* (2019.01)

(52) U.S. Cl.
CPC .......... *G06F 16/2365* (2019.01); *G06F 16/27* (2019.01)

(58) Field of Classification Search
CPC ............................. G06F 16/2365; G06F 16/27
USPC ........................................................ 707/687
See application file for complete search history.

(56) References Cited

U.S. PATENT DOCUMENTS

| 8,490,004 | B2 | 7/2013 | Shuster |
| 8,799,331 | B1 * | 8/2014 | de Vries ............ G06F 16/24575 707/804 |
| 10,423,726 | B2 | 9/2019 | Bacarella |
| 10,467,065 | B2 | 11/2019 | Ross |
| 10,484,376 | B1 | 11/2019 | Laucius |
| 10,540,640 | B1 | 1/2020 | James |
| 10,547,594 | B2 | 1/2020 | Chang |
| 10,599,780 | B2 | 3/2020 | Bacarella |
| 10,616,160 | B2 | 4/2020 | Bastide |
| 10,643,750 | B2 | 5/2020 | Ghouri |

(Continued)

FOREIGN PATENT DOCUMENTS

| EP | 3563596 A1 | 11/2019 |
| EP | 3606123 A1 | 2/2020 |

(Continued)

OTHER PUBLICATIONS

Cigna for Health Care Professionals, https://cignaforhcp.cigna.com/app/login, accessed at least as early as Dec. 4, 2019.

(Continued)

*Primary Examiner* — Michael Pham
(74) *Attorney, Agent, or Firm* — Miller Johnson

(57) ABSTRACT

A method for enterprise data management includes permitting a first node to join a network having a storage system. Each respective node is assigned a protocol that indicates how the respective node consumes a record. The method also receives a first record from the first node having a first protocol. In response to the receipt, the method determines a first confidence for the first record according to the first node. The method also provides the first record to a second node based on a second protocol assigned to the second node. In response to providing the first record to the second node, the method also determines a second confidence for the first record according to the second node. The method further updates a view associated with the storage system and accessible to each node within the network to indicate the first confidence and the second confidence for the first record.

20 Claims, 10 Drawing Sheets

(56) References Cited

U.S. PATENT DOCUMENTS

| | | |
|---|---|---|
| 10,776,586 B2 | 9/2020 | Bacarella |
| 10,937,526 B2 | 3/2021 | Cox |
| 10,956,932 B2 | 3/2021 | Smith |
| 2015/0066678 A1 | 3/2015 | Ogilvie |
| 2019/0058697 A1 | 2/2019 | Chang |
| 2019/0349261 A1 | 11/2019 | Smith |
| 2020/0013050 A1 | 1/2020 | Finlow-Bates |
| 2020/0043000 A1* | 2/2020 | Unagami .............. H04L 63/126 |
| 2020/0118127 A1 | 4/2020 | Miller |

FOREIGN PATENT DOCUMENTS

| | | |
|---|---|---|
| IN | 201741013738 | 10/2018 |
| JP | 2019526120 A | 9/2019 |
| TW | 201810151 A | 3/2018 |
| WO | 2018126075 A1 | 7/2018 |
| WO | 2018162687 A1 | 9/2018 |
| WO | 2019036019 A1 | 2/2019 |
| WO | 2019079890 A1 | 5/2019 |
| WO | 2019222904 A1 | 11/2019 |

OTHER PUBLICATIONS

Council for Affordable Quality Healthcare; https://www.caqh.org/; accessed at least as early as Dec. 4, 2019.
National Plan & Provider Enumeration System, https://nppes.cms.hhs.gov/; accessed at least as early as Dec. 4, 2019.

* cited by examiner

ENTERPRISE DATA MANAGEMENT LOGIC CONFIGURATION

FIELD

The present disclosure relates to distributed data management and more particularly to an enterprise data management logic configuration in a distributed network.

BACKGROUND

Networked ecosystems have become more common to provide businesses platforms to interconnect their various organizational units. Each network may include multiple computing nodes capable of generating data that may be consumed by other computing nodes within the network. As these networks become more complicated, the management of data for the network can proportionally become more complicated. For example, each computing system in the network produces data in a different manner causing varying degrees of accessibility, security, and/or reliability for other computing systems. Meaning that, when data is produced in the network by one entity that may be of value to another entity, the interested entity may have to perform additional operations to ensure its own comfort with the information that it is interested in. This may be especially true when computing nodes operate somewhat autonomously when providing their services because each computing node may have varying degrees of credibility with regard to data generation and/or data consumption.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

One aspect of the disclosure provides a system for presenting confidence levels for a data record. The system includes data processing hardware and memory hardware. The memory hardware is configured to store instructions that, when executed by the data processing hardware, cause the data processing hardware to perform operations. The operations include permitting a first computing node to join a distributed network having a persistent storage system. Each computing node within the distributed network is assigned a data consumption protocol that indicates how the computing node consumes a data record from the persistent storage system. The distributed network supports a plurality of data consumption protocols. The operations also include receiving, at the persistent storage system, a first data record from the first computing node having a first data consumption protocol. In response to receiving the first data record, the operations further include determining a first confidence level for the first data record from a set of confidence levels. The first confidence level represents a veracity of the first data record according to the first computing node. The operations also include providing the first data record to a second computing node based on a second data consumption protocol assigned to the second computing node. In response to providing the first data record to the second computing node, the operations also include determining a second confidence level for the first data record from the set of confidence levels. The second confidence level represents the veracity of the first data record according to the second computing node. The operations further include updating a view associated with the persistent storage system and accessible to each computing node within the distributed network to indicate the first confidence level and the second confidence level for the first data record.

Another aspect of the disclosure provides a computerized method for presenting confidence levels for a data record. The method includes permitting a first computing node to join a distributed network having a persistent storage system. Each computing node within the distributed network is assigned a data consumption protocol that indicates how the computing node consumes a data record from the persistent storage system. The distributed network supports a plurality of data consumption protocols. The method also includes receiving, at the persistent storage system, a first data record from the first computing node having a first data consumption protocol. In response to receiving the first data record, the method further includes determining a first confidence level for the first data record from a set of confidence levels. The first confidence level represents a veracity of the first data record according to the first computing node. The method also includes providing the first data record to a second computing node based on a second data consumption protocol assigned to the second computing node. In response to providing the first data record to the second computing node, the method also includes determining a second confidence level for the first data record from the set of confidence levels. The second confidence level represents the veracity of the first data record according to the second computing node. The method further includes updating a view associated with the persistent storage system and accessible to each computing node within the distributed network to indicate the first confidence level and the second confidence level for the first data record.

In some examples, the first data consumption protocol includes a condition for data record consumption that is different than the second data consumption protocol. In some implementations, each respective confidence level of the set of confidence levels includes a respective confidence threshold that delineates a boundary for the respective confidence level. The first confidence level and the second confidence level may correspond to the same confidence level. Additionally, providing the first data record to the second computing node may be based on the first confidence level for the first data record according to the first computing node.

In some configurations, the second data consumption protocol indicates that the second computing node obtains a data record from the persistent storage system automatically upon ingestion of the data record at the persistent storage. In these configurations, the second confidence level indicates that the second computing node did not verify the first data record upon receipt of the first data record. In these configurations, the operations or method may also include receiving a message from the second computing node that indicates a verification result from the second computing node about the first data record, determining that the verification result indicates that the second confidence level has changed, and updating the second confidence level to represent a confidence indicated by the verification result.

In some examples, the operations (or computerized method) further include generating a confidence score based on set of characteristics of the respective data record and a provider of the respective data record. Determining the first confidence level may include determining whether a first confidence score for the first data record satisfies a confidence threshold associated with a respective confidence level. The set of characteristics may include an indication of freshness for data information included in the respective data record. The confidence score may represent a dynamically changing reliability rating for the provider of the respective data record.

In some implementations, providing the first data record to the second computing node is also based on the first confidence level for the first data record according to the first computing node satisfying a consumption condition defined by the second data consumption protocol. Here, the first confidence level may satisfy the consumption condition when the first confidence level corresponds to one of a subset of one or more confidence levels from the set of confidence levels.

Optionally, the operations or computerized method may further include, in response to the second confidence level satisfying a confidence threshold associated with the respective confidence level, providing the first data record to a third computing node based on a third data consumption protocol assigned to the third computing node. Here, the third data consumption protocol may include a condition that at least two computing nodes have confidence levels that satisfy the confidence threshold.

In some examples, the view includes a section that represents a consensus confidence for the first data record. In these examples, the operations or computerized method may further include determining the consensus confidence for a consensus of computing nodes within the distributed network. Here, the operations or computerized method may additionally update the section to represent the consensus confidence for the first data record. In various implementations, a non-transitory computer-readable medium may store instructions that embody the above methods.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1:
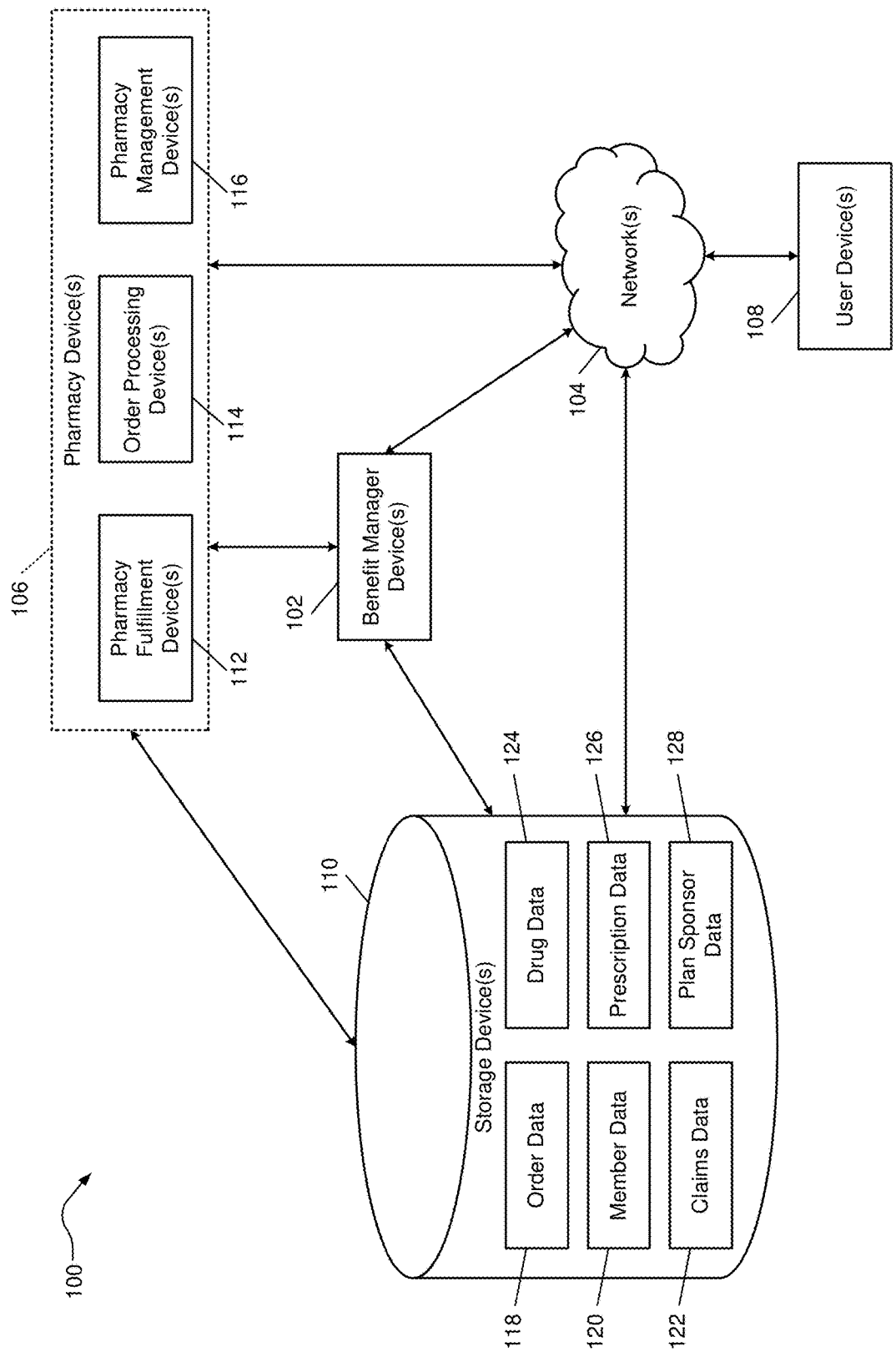
FIG. 1 is a functional block diagram of an example system including a high-volume pharmacy.

It is common for data records to be shared or exchanged among computing nodes of a network. Unfortunately, this may lead to issues coordinating between the computing nodes or trusting data records (such as during coordination between computing nodes). As an example, one computing node may perform very little diligence about the veracity of the information contained within a data record that it exchanges with other computing nodes within the network. In this situation, other computing nodes may be consuming the data record without realizing the potential risk of inaccurate information contained in the data record. That is, a data record may be untrustworthy without being identified as such.

A data record may be untrustworthy for a variety of reasons. In some instances, the source of the data record does not confirm the accuracy of the data information that forms the data record. The source of the data record may fail to realize that the data information produced is somehow faulty or that perhaps the manner of producing the data information is causing inaccuracies. The data record or source of the data information for the data record may be old or stale; meaning that the data information contained in a data record has not been verified for some extended duration of time. For instance, a data record may be considered stale when it has not been verified within a specified period from its creation (such as six months from its creation, as just one example). The specified period for other data records may be longer—such as one or more years. The specified period varies inversely with how dynamic the data is understood to be. At one extreme, some data may be so dynamic that the specified period is one minute or less.

Because data records can suffer inaccuracies, computing nodes that provide or consume data records often have to implement processes that verify data records. This ensures that the data consumed by a computing node does not cause further issues with other processes. For instance, if a computing node consumes a set of data records for customer addresses, that computing node may, for example, use the customer addresses for other activities, such as advertising. If the customer addresses being ingested by the computing node from data records were inaccurate, then the computing node's advertising may not reach the intended recipients.

To address some of these issues, a network according to the principles of the present disclosure may employ a data logic manager that operates to facilitate the consumption of data records according to data record consumption protocols. These data record consumption protocols include one or more consumption conditions that can be tailored to align more closely with the data consumption needs for a computing node. Moreover, this approach can result in different computing nodes having different data record consumption protocols. With a potential array of protocols, the network can configure its member nodes to implement protocols that not only fit their individual consumption needs with respect to trust and reliability, but also operate in coordination for the network to prevent computationally inefficient activity. This can be valuable, especially in networks like organizational units of an enterprise where the members have pre-existing relationships and a higher-level purpose to coordinate.

High-Volume Pharmacy

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug was successfully adjudicated. The aforementioned adjudication operations generally occur before the copayment is received and the prescription drug is dispensed. However in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, age, date of birth, address (including city, state, and zip code), telephone number, e-mail address, medical history, prescription drug history, etc. In various implementations, the prescription drug history may include a prior authorization claim history—including the total number of prior authorization claims, approved prior authorization claims, and denied prior authorization claims. In various implementations, the prescription drug history may include previously filled claims for the member, including a date of each filled claim, a dosage of each filled claim, the drug type for each filled claim, a prescriber associated with each filled claim, and whether the drug associated with each claim is on a formulary (e.g., a list of covered medication).

In various implementations, the medical history may include whether and/or how well each member adhered to one or more specific therapies. The member data 120 may also include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. In various implementations, the member data 120 may include an eligibility period for each member. For example, the eligibility period may include how long each member is eligible for coverage under the sponsored plan. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally or alternatively, the claims data 122 may include claims that have been de-identified (that is, associated with a unique identifier but not with a particular, identifiable member). In various implementations, the claims data 122 may include a percentage of prior authorization cases for each prescriber that have been denied, and a percentage of prior authorization cases for each prescriber that have been approved.

The drug data 124 may include drug name (e.g., technical name and/or common name), other names by which the drug is known, active ingredients, an image of the drug (such as in pill form), etc. The drug data 124 may include information associated with a single medication or multiple medications. For example, the drug data 124 may include a numerical identifier for each drug, such as the U.S. Food and Drug Administration's (FDA) National Drug Code (NDC) for each drug.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
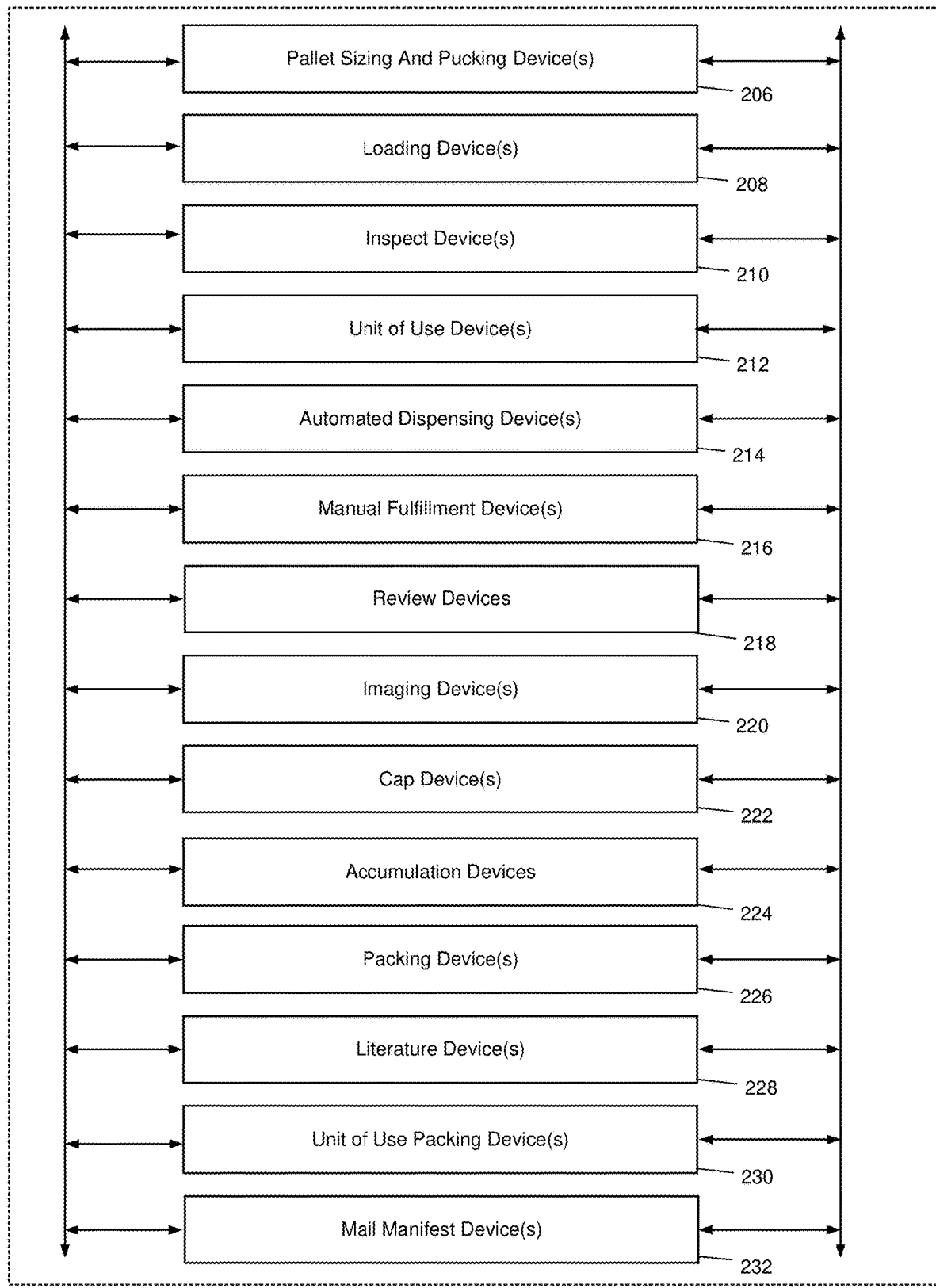
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
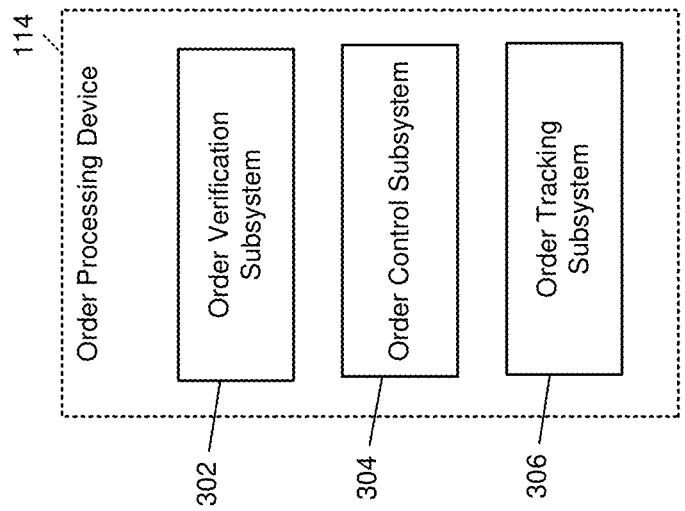
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Enterprise Data Management

Figure 4:
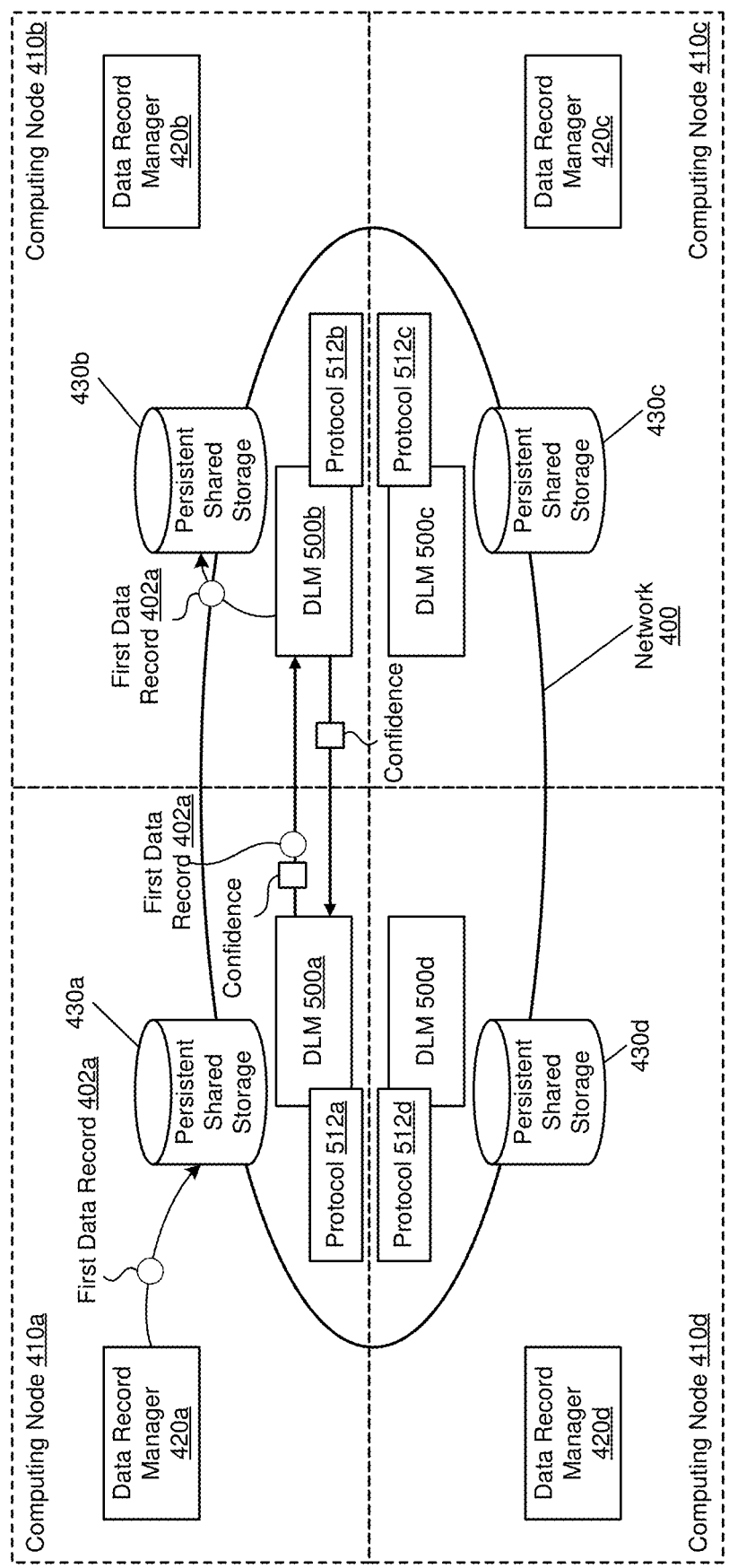
FIG. 4 is a schematic view of an example distributed network for exchange data records.

FIG. 4 is an example of a distributed network 400 for exchanging data records 402. The distributed network 400 generally includes a plurality of computing nodes 410a-d (each referred to generally as computing node 410). The computing nodes 410 include respective data record managers (DRMs) 420a, 420b, 420c, and 420d (each referred to generally as DRM 420). The DRM 420 may produce or obtain data records 402 that the DRM 420 communicates to a data logic manager (DLM) 500. For instance, the DRM 420 communicates with a variety of data record providers that generate data records 402 for the computing node 410 associated with the DRM 420.

As an example, the distributed network 400 corresponds to a networked ecosystem for an enterprise. An enterprise can formally or informally refer to a business that includes multiple organizations where each organization focusses on a particular goal or set of goals in furtherance of the purpose of the enterprise. As a networked ecosystem for an enterprise, the distributed network 400 is a private network that links the computing resources of its organizations. A private network, unlike a public network, is a specified network with one or more restrictions (e.g., member restrictions or access restrictions) to promote a secure environment. In this sense, a private network includes a means to prevent or inhibit general public access to the private network. For example, a private network has a unique configuration (e.g., a unique internet protocol address) that is shared or somehow conveyed to its members to enable these members to have access to the private network.

In some examples, with a private network, each member or participant of the distributed network 400 is granted permission to join the distributed network 400. For example, the distributed network 400 explicitly grants permission to members by an invite-only process to ensure only authorized entities have access to the distributed network 400. An invite-only process may be such that an existing member (e.g., a managing or administrative member) is able to invite other non-member(s) to the distributed network 400 (e.g., if they meet particular member criteria). In some configurations, a particular member or entity serves as the administrative manager that controls the invite process, sets the membership criteria, and/or enforces the membership criteria during operation of the distributed network 400.

To conceptualize, a large corporation may operate the distributed network 400 as a private network where organizational units of the corporation (e.g., divisions, branches, teams) are members of the distributed network 400 while outside entities are excluded. The computing systems of the corporation are computing nodes 410 that can communicate with each other. Each of these organizational units may, due to their different functionality, produce, generate, or otherwise obtain data records 402. Since these organizational units are often collaborative in nature within the distributed network 400, a computing node 410 associated with one entity may be contributing and/or consuming data records 402 from one or more other computing nodes 410.

A computing node 410 may refer to a one or more computing resources that form a computing system. In this regard, a computing node 410 may refer to a local area network (LAN) (e.g., a private LAN) while the distributed network 400 itself may be more akin to a larger network, such as a wide area network (WAN). For example, the distributed network 400 is a WAN that interconnects the computing nodes 410 that each individually represent a LAN. In some implementations, the computing nodes 410 are computing systems for different types of service providers. The plurality of computing nodes 410 may form the distributed network 400 to provide an array of services (e.g., linked or interconnected services). For instance, a payer, or financier of healthcare services, may form a distributed network 400 with some number of hospitals, rehab center(s), clinics, pharmacies, dentists, and optometrists to provide healthcare services to a user or set of users associated with the distributed network 400. The network relationship may be formed by contractual arrangements.

To allow the computing nodes 410 of the distributed network 400 to broadcast and/or exchange data records 402 among each other, the distributed network 400 includes one or more persistent shared storage systems 430a, 430b, 430c, and 430d (each referred to generally as persistent shared storage system 430). Persistent shared storage (also referred to as persistent storage, shared storage, and storage system) refers to a data storage configuration where data records 402 that are written to this storage become immutable. Moreover, by being "shared" storage, the data stored within the persistent storage 430 is communicable or obtainable to all network participants (i.e., computing nodes 410) who desire access or are authorized to be given access.

In some configurations, the data records 402 can be considered "immutable" because when a data record 402 needs to be modified or altered, the data record 402 is not overwritten, but instead written as a new data record 402 with data information that characterizes the modification of the data record 402. As a new data record 402, the data record 402 may include an indication that it is the most recent version of the data information. In the case of sequentially written records (e.g., a block chain), that indication may be the position or location of the new data record 402 within the storage. For example, the most recent version is at a storage location closer to the most recent records than the prior version of the data record 402. As another example, in a block chain configuration, a data block closer to the end of the chain of blocks is more recent than a data block closer to the beginning of the chain of blocks.

In some examples, the storage system 430 utilizes a block chain configuration such as a permissioned block chain. In a block chain configuration, the data records 402 that are written to the shared storage system 430 are written sequentially (e.g., in a data chain) in a data block such that a second data record contained in a second data block is appended to a first data record contained in a first data block. By writing data sequentially into the shared storage 440, computing nodes 410 with access to the data can inherently gain an understanding of the timing and sequence of data transactions. Moreover, by appending one record to the next record, this data writing/storage sequence prevents data blocks from being altered by the insertion of data between blocks or records. In addition, with the data stored in each storage record being immutable once written to storage, the data storage pattern can allow a computing node 410 to access (e.g., to view/read) the sequence of data storage transactions to identify any and/or all data transactions corresponding to a particular computing node 410 and/or portion of data information.

Even though computing nodes 410 operate in a network 400, the computing nodes 410 may operate their own verification process. Although this may reduce the inaccuracies of data records 402 being passed about the distributed network 400, it is not an entirely efficient practice. For instance, a first computing node 410 verifies the data information in the data record 402 upon creation or when providing it to the distributed network 400. Once provided to the distributed network 400, another computing node 410 may consume that data record 402. When this occurs, the computing node 410 consuming the data record 402 may perform a verification process at the time of consumption. In this situation, the data record 402 may have been verified twice in a relatively short time period. Furthermore, during that relatively short time period, there was a very low risk that the veracity of the data record 402 decayed. Notably, it was fairly redundant to perform this back-to-back verification on the data record 402.

In the situation described, instead of each computing node 410 performing verification of the data record 402, it would be more efficient if the two computing nodes 410 could in some way coordinate their verification of the data record 402. Moreover, depending on the activities of the computing node 410, different computing nodes 410 may have different needs with respect to the trustworthiness or veracity of the data record 402. For example, some computing nodes 410 do not have a high sensitivity for trustworthiness of data records 402. The amount of trust is generally inversely proportional to the impetus for verification. When an entity has or is characterized as high trust, it trusts the data information in the data record 402 and therefore would not necessarily see an immediate need to verify its veracity. In contrast, low trust in the data information of a data record 402 means that there is an impetus to verify the data record 402.

To illustrate, if a computing node 410 corresponds to a marketing division or marketing provider, there is an understanding that a marketing campaign which uses data records 402 may have less than a 5% success rate. Here, a computing node 410 corresponding to a marketing company or division may have high trust in the veracity of a data record 402 and not see a need to perform verification for every data record 402 that this computing node 410 consumes. On the other hand, if the computing node 410 is responsible for consuming information related to vital records, that computing node 410 has a high sensitivity to trustworthiness since incorrect vital records could severely impact its customers.

Whether a computing node 410 performs a verification process can additionally or alternatively depend on characteristics of the computing node 410. For example, if a computing node 410 corresponds to an entity that prioritizes other aspects of its functionality over the consistent veracity of the data records 402 it consumes, this computing node 410 may perform verification of the data records 402 it consumes and/or produces at a low frequency. As an example, a particular computing node 410 determines that frequently performing verification is a computationally expensive process and that it cannot afford to have low trust for data records 402. Therefore, the computing node 410 does not immediately verify the data records 402 that it produces (e.g., contributes to the distributed network 400) or consumes. In this sense, cost and resource allocation can have an impact on when and how often a verification process is performed by a computing node 410.

In this respect, a network 400 can include computing nodes 410 that would prefer a spectrum of trustworthiness ranging from requiring a high level of trust to a low level of trust. Yet unfortunately, networks, especially in decentralized networks, do not tend to cater to the specific trust or reliability needs of their members and more particularly the needs of each member. For instance, in block chain systems, record keeping for members with access to the block chain system is done with different types of consensus mechanisms.

A consensus mechanism is generally a mechanism (i.e., a process) used to achieve agreement, trust, and/or security for records broadcast to a distributed system like a block chain system. Decentralized systems use consensus mechanisms because, instead of having a central administrator who is responsible for trust and/or security, a decentralized system has to establish agreement, trust, and/or security between members without a central administrator. Two more popular types of consensus mechanisms are proof-of-work (PoW) and proof-of-stake (PoS).

A PoW mechanism is a mechanism where adding new information to the block chain (e.g., a new block in the chain) for broadcast requires members to verify the new information and reach a consensus. Here, consensus occurs, which allows the new information to be approved for addition to the block chain, when a majority of members have performed successful verification of the new information. A PoS mechanism is a mechanism where stakeholders stake resources for the ability to validate the new information. Once a consensus of validators approve the addition of the new information to the block chain, that new information is added to the chain. This system promotes security because members of the block chain system have to risk their resources as the stake for the opportunity to validate.

What becomes apparent with these consensus mechanisms is that the data record is often not stored to the storage (e.g., storage systems associated with members that did not produce the data record) without the verification process forming some type of consensus. Yet there are networks where it is not in the interest of the network itself or individual members to require a consensus before members have the ability to consume data records 402 from another member. That is, every member may not have low trust for the data records 402 being provided to their shared storage system 430. Moreover, although it may be beneficial for networks with unrelated members to promote strict verification practices (e.g., requiring a consensus prior to adding the data information to storage), there are private network like network 400 that who would benefit from their members having customizable trust protocols. That way, data record consumption can more closely fit the data record reliability needs of a given network and/or coordinate the reliability between members of the network.

To address some of these data exchange issues, the distributed network 400 includes the data logic manager (DLM) 500. The DLM 500 is configured to manage the data consumption relationships between computing nodes 410 of the distributed network 400. For example, the DLM 500 operates to maintain and/or to coordinate the exchange of data records 402 between computing nodes 410 of the distributed network 400. When the distributed network 400 is entirely decentralized, the storage system 430 and the DLM 500 may have some or all aspects of their functionality residing on each computing node 410. In other configurations, the distributed network 400 may be less decentralized such that the storage system 430 and/or the DLM 500 do not reside on every computing node 410.

Referring to FIG. 4, the distributed network 400 includes four computing nodes 410a, 410b, 410c, and 410d as the plurality of computing nodes 410. Here, each of the four computing nodes 410 include their own DRM 420, storage system 430, and DLM 500. The DRM 420 generally manages the intake of data records 402 for the computing node 410 (e.g., the local intake of data records 402). For instance, the DRM 420 is the receiver of data records 402 from one or more venders of the computing node 410. Additionally or alternatively, the computing node 410 is able to publish or to generate its own data records 402 (e.g., using its own personnel or operations).

In FIG. 4, each computing node 410 has already been established or permitted to be a member of the distributed network 400. Yet if this were not the case, the distributed network 400, as a private network, would have to first establish a computing node 410 as a member for that computing node 410 to be able to participate in the distributed network 400 (e.g., leverage the functionality of the DLM 500 and the storage system 430). However, as a member, once the DRM 420 of a computing node 410 obtains a data record 402, the DRM 420 may be configured to communicate this data record 402 to the storage system 430 associated with the computing node 410. As shown in FIG. 4, the DRM 420a for the first computing node 410a communicates a first data record 402a to the first storage system 430a.

In response to receiving a data record 402 (e.g., the first data record 402a), the DLM 500 associated with the computing node 410 that provided the data record 402 is configured to determine an indication of an amount of confidence that the providing computing node 410 has in the data record 402 provided. For instance, in FIG. 4, the first DLM 500a associated with the first computing node 410a that provided the first data record 402a determines the indication of the amount of confidence that the first computing node 410a has in the first data record 402a. This confidence determination may occur before the data record 402 is written to the persistent storage system 430, while the data record 402 is being written to the persistent storage system 430, or after the data record 402 was written to the storage system 430. The indication of the confidence (e.g., shown as a confidence level 524a) is then associated with the first data record 402a in some manner to serve as a type of verification for the data record 402 from the computing node 410 that provided or contributed the data record 402 to the distributed network 400.

With the data record 402 now provided to the distributed network 400, the data record 402 may be consumed by other computing nodes 410. To manage the data consumption relationships among the computing nodes 410, a DLM 500 uses data consumption protocols 512. A data consumption protocol 512 refers to criteria or conditions that dictate how and/or when a computing node 410 will consume data records 402. Each computing node 410 may have its own unique data consumption protocol 512 (e.g., the four computing nodes 410a-d have four different data consumption protocols 512a-d) or may have the same data consumption protocol 512 as another computing node 410.

By having the capability of different data consumption protocols 512, the distributed network 400 can avoid having to deal with the rigidity of traditional consensus mechanisms. That is, a traditional consensus mechanism (e.g., PoW or PoS) uniformly dictates that a data record cannot be consumed by other members until consensus occurs. In contrast, the data consumption protocol 512 is more flexible in that it can be setup with consumption conditions other than and/or including consensus. Moreover, with the data consumption protocol 512, members can have data consumption protocols 512 tailored to their consumption needs.

To illustrate, FIG. 4 depicts that the second computing node 410b has a second consumption protocol 512b with the consumption condition that the second computing node 410b automatically or immediately consumes a data record 402 provided to the distributed network 400. This is akin to the second computing node 410b having high trust and being configured with a data consumption protocol 512 that reflects that high trust. In contrast, a third consumption protocol 512c and a fourth consumption protocol 512d have a consumption condition other than automatic consumption since the first data record 402a is not automatically consumed by the third computing node 410c or the fourth computing node 410d.

Referring to FIGS. 5A-5D, the DLM 500 includes a consumption coordinator 510, a confidence generator 520, and a viewer 530. In a broad sense, the consumption coordinator 510 assigns data consumption protocols 512 and coordinates consumption of a data record 402 provided by a computing node 410 (e.g., a providing computing node 410) to other computing nodes 410 (e.g., to non-providing computing nodes 410). The confidence generator 520, upon receipt of a data record 402, determines the indication of the amount of confidence in the data record 402 from the computing node 410 that provided the data record 402 or from the computing node 410 that consumes the data record 402. The viewer 530 is responsible for generating and/or managing a view 532 corresponding to a data record 402. The view 532 for a particular data record 402 includes a section 534 that represents or conveys the confidence of each computing node 410 in the data record 402.

Figure 5A:
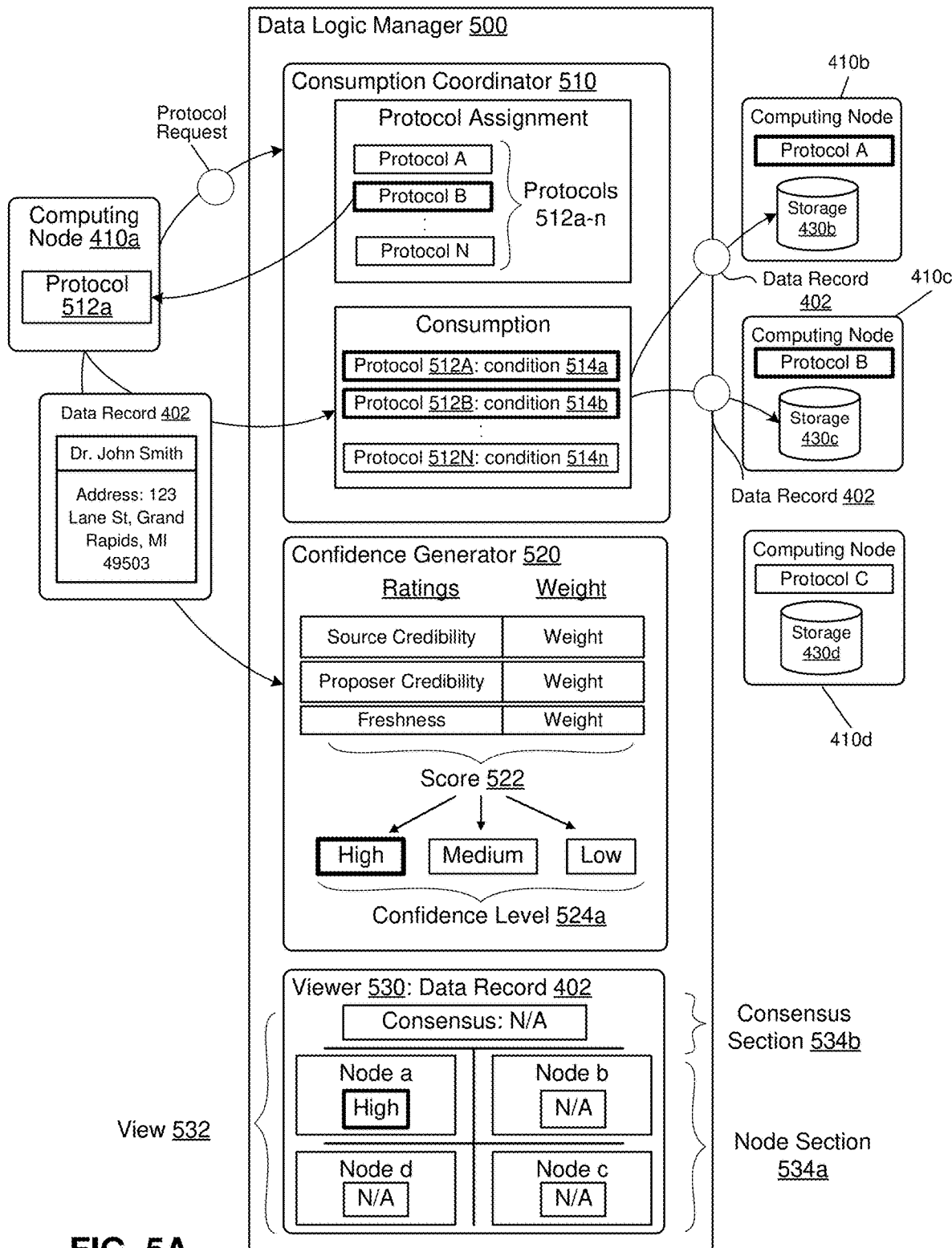
FIG. 5A is a schematic view of an example data logic manager, which may be deployed within the system of FIG. 4.
Figure 5B:
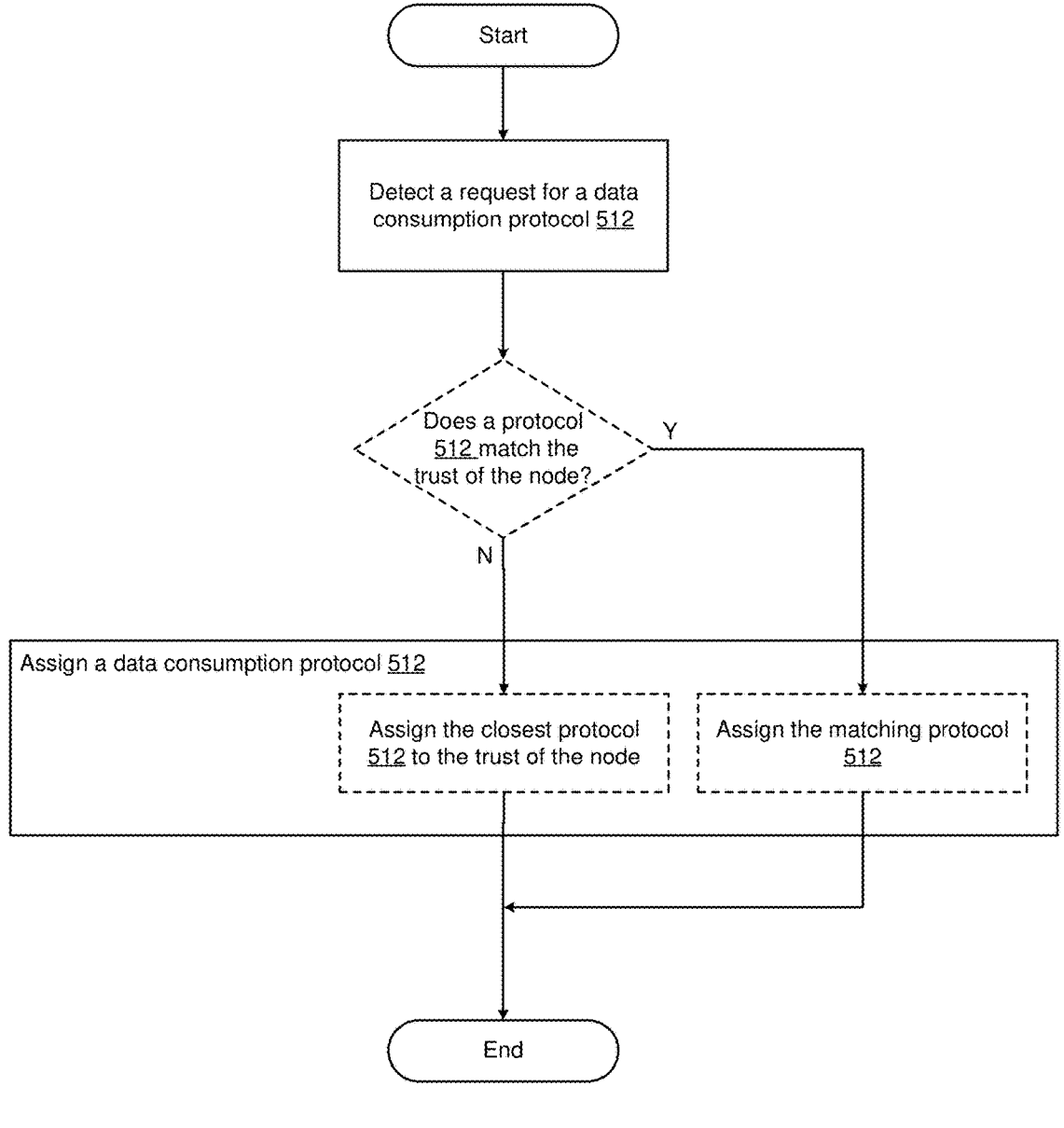
FIGS. 5B-5D are schematic views of example components of the data logic manager.

As FIGS. 5A and 5B illustrate, in some examples, the consumption coordinator 510 initiates a protocol assignment process when the consumption coordinator 510 detects a request for a data consumption protocol 512. In some implementations, the request occurs in response to the distributed network 400 establishing a computing node 410 as a member of the distributed network 400 (i.e., permitting a computing node 410 to join the distributed network 400). The request may also occur when a computing node 410 wants to change or adopt a new data consumption protocol 512. In other words, a computing node 410 may decide that the consumption conditions of their existing data consumption protocol 512 does not align with their trust needs and requests a new data consumption protocol 512 that replaces the existing data consumption protocol 512.

In response to receiving the request for a data consumption protocol 512, the consumption coordinator 510 assigns the computing node 410 associated with the request a new data consumption protocol 512. In some implementations, the consumption coordinator 510 determines which data consumption protocol 512 to assign to the computing node 410 by determining what degree of trust the computing node 410 has. Here, with a determination of the degree of trust for the computing node 410, the consumption coordinator 510 tries to match that determination with an available data consumption protocol 512. That is, in some configurations, there is a set of data consumption protocols 512 preprogrammed or setup for the distributed network 400 and the consumption coordinator 510 either matches a data consumption protocol 512 from the set to the degree of trust or assigns the data consumption protocol 512 from the set that most closely matches the trust of the computing node 410.

In some examples, each data consumption protocol 512 includes a label that indicates the level of trust that characterizes the data consumption protocol 512. The consumption coordinator 510 may determine the degree of trust for a computing node 410 in a variety of ways. Some of these ways include requesting that the computing node 410 indicate its degree of trust by selecting a trust level. Another way is that the consumption coordinator 510 may identify the computing node's propensity for trust from the computing node's frequency of verification/validation over some period of time. That is, if the consumption coordinator 510 determines that the computing node 410 is performing verification at a high frequency (e.g., twice a week), the consumption coordinator 510 designates the computing node 410 as low trust and therefore assigns a data consumption protocol 512 to align with this low trust.

In addition to assigning or reassigning a data consumption protocol 512, the consumption coordinator 510 is configured to facilitate the consumption of data records 402 for computing nodes 410 (i.e., non-providing nodes) other than the computing node 410 that provides the data record 402 to the distributed network 400 (i.e., the providing node). In response to receiving a data record 402 from a providing node 410, the consumption coordinator 510 identifies non-providing nodes 410 that may desire (e.g., based on their data consumption protocols 512) to consume the data record 402. In some examples, such as FIG. 5C, the consumption coordinator 510 selects a non-providing node 410 and identifies the data consumption protocol 512 for the selected node 410. With the data consumption protocol 512 for the selected node 410, the consumption coordinator 510 determines whether consumption condition(s) of the data consumption protocol 512 indicate that the selected non-providing node 410 should consume the data record 402.

As an example, referring back to FIG. 4, the second computing node 410b has the second data consumption protocol 512 with a consumption condition 514 that the second computing node 410b automatically receives data records 402 that are provided to the distributed network 400. In this example, the consumption coordinator 510 would determine that the consumption condition(s) 514 of the second data consumption protocol 512 have been satisfied and the consumption coordinator 510 promotes the consumption of the data record 402 for the non-providing node 410 (e.g., the second computing node 410b) with the satisfied consumption conditions 514.

In some configurations, the consumption coordinator 510 promotes consumption of the data record 402 by providing (or communicating and/or broadcasting) the data record 402 to the DLM 500 of the non-providing node 410 with the satisfied consumption conditions 514. Additionally or alternatively, the DLM 500 of the non-providing node 410 with the satisfied consumption conditions 514 may obtain the data record 402 based on some indication from the consumption coordinator 510 that the non-providing node 410 is ripe for consumption of the data record 402. For instance, the consumption coordinator 510 communicates a message to the DLM 500 of the non-providing node 410 as the indication.

Figure 5C:
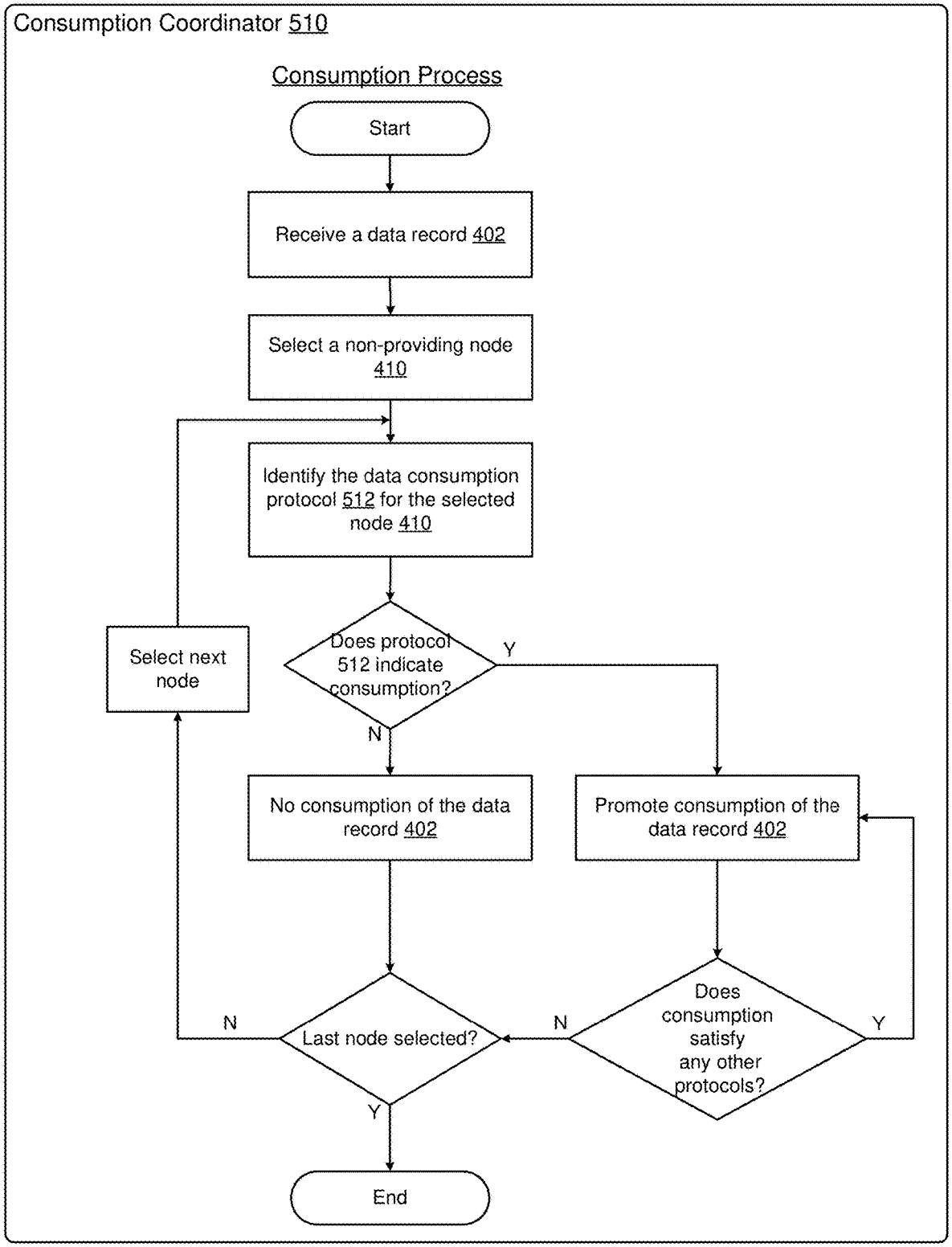

If instead the consumption coordinator 510 determines that the consumption condition(s) 514 of the data consumption protocol 512 of the selected non-providing node 410 are not satisfied, the consumption coordinator 510 does not promote consumption of the data record 402 for the selected node 410 and instead proceeds to select another non-providing node 410 to repeat the process. For instance, the consumption coordinator 510 determines whether the selected non-providing node 410 is the last node from the set of non-providing computing nodes 410. In response to the consumption coordinator 510 determining that the selected non-providing node 410 is not the last node from the set of non-providing computing nodes 410, the consumption coordinator 510 selects another non-providing node 410 from the set of non-providing nodes 410 and repeats the process to identifying the data consumption protocol 512 (e.g., the consumption conditions 514) for the newly selected non-providing node 410 and determining whether the data consumption protocol 512 is satisfied as shown in FIG. 5C. On the other hand, in response to the consumption coordinator 510 determining that the selected non-providing node 410 is the last node from the set of non-providing nodes 410, the consumption coordinator 510 ends the consumption process for the data record 402 from the providing node 410.

In response to the data consumption protocol 512 for the selected non-providing node 410 being satisfied, the consumption coordinator 510 is configured to determine whether the data record's consumption by one non-providing node 410 causes another data consumption protocol 512 to be satisfied. That is, some consumption conditions 514 may be contingent or dependent on whether other nodes 410 consume the data record 402. As an example, a consumption condition 514 may be that more than one non-providing node 410 has consumed the data record 402 or that a majority of the computing nodes 410 have consumed the data record 402. For consumption conditions 514 like these, the consumption coordinator 510 may review the data consumption protocols 512 of the computing nodes 410 after a computing node 410 consumes a data record 402 to ensure that computing nodes 410 with consumption conditions 514 dependent on the behavior of other computing nodes 410 are consuming data records 402 when it is appropriate.

Figure 5D:
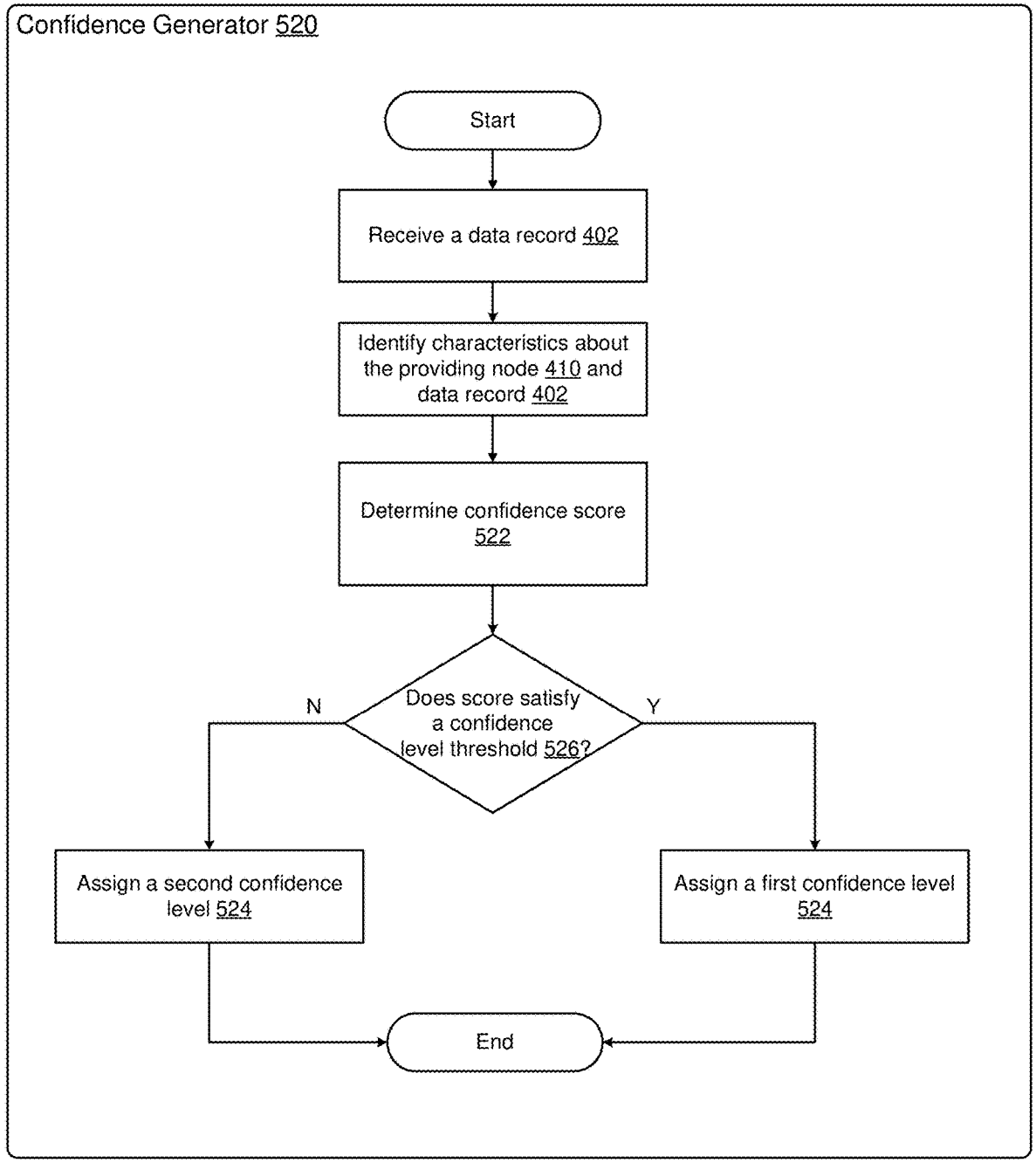

Referring to FIGS. 5A and 5D, the confidence generator 520 (also referred to as generator 520) is configured to determine an indication of the amount of confidence that a computing node 410 has for a particular data record 402. In this sense, there may be a confidence for each computing node 410 of the distributed network 400 for each data record 402 because the confidence represents a computing node's specific confidence with respect to the data record 402. This determination can typically occur at different times during the exchange of data records 402. The confidence generator 520 may determine the amount of confidence in response to a providing node 410 providing the data record 402 to the distributed network 400 (e.g., during the time when writing the data record 402 to a storage system 430 of the distributed network 400) or in response to consumption of the data record 402. For instance, a computing node 410 consumes the data record 402 and uses the confidence generator 520 to determine its own confidence in the data record 402.

In the example of FIG. 5A, the providing node 410a provides a data record 402 that includes an address of a health provider, Dr. John Smith. Upon receipt of the data record 402 from the node 410 (e.g., detecting receipt of the data record 402 at a storage system 430 of the distributed network 400), the generator 520 is configured to generate the confidence of the data record 402 with respect to the computing node 410. Although FIGS. 5A and 5D illustrate that the confidence is represented as a confidence score 522 converted into a confidence level 524, this approach is merely illustrative to show that the DLM 500 conveys the confidence that a computing node 410 has for a record 402 and is capable of integrating that that confidence into the logic associated with the management of data record exchange.

In some implementations, such as FIGS. 5A and 5D, the generator 520 determines the confidence by generating a confidence score 522 and converting the confidence score 522 into a particular confidence level 524. Referring to FIG. 5D, the generator 520 is configured identify characteristics about the computing node 410 that provides the data record 402 (e.g., the providing node 410) and/or characteristics about the data record 402 (e.g., the data information contained in the data record 402). For instance, FIG. 5A illustrates different characteristics that can influence the confidence score 522. That is, with these characteristics, the generator 520 determines a confidence score 522.

In the configuration of FIG. 5A, the confidence score 522 includes three components. The first and third components generally refer to the data record itself while the second component refers to the proposer of the data record 402 (e.g., the providing node 410). Here, the first component is a rating that represents the credibility of the source of the data information contained in the data record 402. The second component is a rating that represents the credibility of the proposer of the data record 402. The third component is a rating that represents the freshness of the data record 402 (e.g., the freshness of the data information of the data record 402). Each of these components are then weighted by a particular weight and combined together to form the score 522.

To illustrate by example, the generator 520 may determine the first component by determining who the source of the data record 402 was and categorizing the source into a particular source type. For instance, there are three types of sources: a third party source (e.g., a vender who not part of the distributed network 400), an internal source (e.g., generated by a computing node 410), and a public source (e.g., from the public domain). Each source type may have a corresponding value that quantitatively represents the type's credibility (e.g., a value between 0 and 1). Here, the generator 520 may consider an internal source to be the most credible (e.g., be assigned a value of 0.75), the third party source to be moderately credible (e.g., be assigned a value of 0.5), and the public source to be the least credible (e.g., be assigned a value of 0.25). Therefore, if the computing node generated the data record 402 for Dr. John Smith, the generator 520 would determine that this internally sourced information had a source credibility rating of 0.75.

For the proposer's credibility or second component, the generator 520 may determine this value dynamically. That is, each proposer (e.g., providing node 410) may have an initial starting credibility value (e.g., a value of 0.5), but then the proposer's rating may change depending on the how dependable or reliable data records 402 are from that proposer going forward. In this respect, if other computing nodes 410 are determining that data records 402 from a particular proposer are not reliable, the initial starting credibility value may decay (or decrease) to proportionally reflect the lack of credibility (e.g., from 0.5 to 0.25). On the other hand, if other computing nodes 410 are determining that data records 402 from a particular proposer are typically reliable, the initial starting credibility value may improve (or increase) to proportionally reflect the reliability (e.g., from 0.5 to 0.75).

With a dynamic approach, the generator 520 is able to learn and/or to adopt to each node's credibility as a proposer of a data record 402. Furthermore, as the DLM 500 learns that certain proposers are more detrimental to the distributed network 400 than other proposers, the DLM 500 or an administrator/member of the distributed network 400 can reconfigure aspects of the distributed network 400 such as data consumption protocols 512 to optimize performance, trust, and/or security for the distributed network 400.

In some implementations, to determine the credibility over time for a particular proposer, the generator 520 is configured to track data records 402 that were provided by the proposer and the confidence that other computing nodes 410 have in those data records 402. By tracking these data records 402, the generator 520 can determine statistics about how other computing nodes 410 perceive data records 402 from the proposer (e.g., what are the percentage of high confidence indications, medium confidence indication, and/or low confidence indications). For example, if a majority of the data records 402 from the proposer result in high confidence levels 524 from other computing nodes 410, the proposer credibility rating (i.e., the second component) for the proposer is adjusted by the generator 520 to match or to track this high confidence (e.g., receives a high credibility rating—like 0.75).

The third component is the freshness of the data information for the data record 402. Freshness typically refers to how much time has passed from the origination of the data information of the data record 402. For instance, if the first computing node 410a generated the address for Dr. John Smith two years ago, the generator 520 would consider that data information to be stale or not very fresh.

In some configurations, the generator 520 determines the freshness rating or third component by determining a length of time from the origination of the data information (e.g., a length of time between the time when the generator 520 is generating the freshness rating and the origination time). The generator 520 may include freshness categories defined by time ranges and then determine which freshness category the length of time corresponds to by identifying the range of time that includes the length of time. For instance, there are three freshness categories: a first category (e.g., high freshness) with a time range of zero to three months; a second category (e.g., moderate freshness) with a time range of three months to a year; and a third category (e.g., stale or low freshness) of greater than a year. Each of these categories may be assigned a value or rating (e.g., between 0 to 1) that indicates a degree of freshness for the data information of the data record 402. Following this example, the first category has a value of 0.25 while the second and third categories have values of 0.5 and 0.75, respectively. In other embodiments, there may be a greater (e.g., five or nine) or lesser number (e.g., two) of freshness categories depending on the configuration of the generator 520 (e.g., the granularity desired for the DLM 500).

In some implementations, the generator 520 determines a rating for the freshness of the data record by categorizing the type of information for the data information and determining a stability for that particular type of information. As a practical example, there may be data that certain doctors move their offices infrequently (e.g., due to particular equipment). Here, the address for this particular doctor would be considered relatively stable due to the fact that there is a low probability that the address changes. In these situations, when the generator 520 factors in the stability of the type of data information, the freshness categories may be adjusted accordingly (e.g., additionally weighted by a stability factor).

Once the generator 520 determines the rating components (e.g., the first component, the second component, and the third component), the generator 520 apply a specific weight to each component. Here, the weight may generally indicate the importance of that component on the overall confidence score 522. Therefore, the weights may be tunable depending on how the DLM 500 wants to value the individual components with respect to the overall confidence score 522. As shown in FIG. 5A, the first component is multiplied by a first weight (e.g., 0.4). The second component is multiple by a second weight (e.g., 0.4) and the third component is multiple by a third weight (e.g., 0.2). The result of each of these components is then added together to form the confidence score 522.

From the confidence score 522, the generator 520 determines what level of confidence that the score 522 indicates. That is, the generator 520 may be configured with a plurality (or set) of confidence levels 524 where each confidence level 524 corresponds to a range of score values. In this approach, the generator 520 is able to generate any number of confidence levels 524 depending on the granularity that is desired for the distributed network 400. The boundary of each range of score values corresponding to a confidence level 524 may be configured as a confidence level threshold 526. In this regard, the generator 520 may determine whether the score 522 satisfies a particular confidence level threshold 526 and based on that determination designate a confidence level 524 to the score 522. In the case of more than two confidence levels 524, the generator 520 may have to evaluate more than one confidence level threshold 526 against the score 522 to determine the appropriate confidence level 524.

As a simple example, if there are two confidence levels (e.g., high confidence and low confidence), when the generator 520 determines that the confidence score 522 satisfies the confidence level threshold 526 delineating these two levels 524, the generator 520 assigns the high confidence level 524 to the confidence score 522. On the other hand, when the generator 520 determines that the confidence score 522 fails to satisfy the confidence level threshold 526 delineating these two levels 524, the generator 520 assigns the low confidence level 524 to the confidence score 522. As shown by FIG. 5A, the number of confidence levels 524 is scalable and may include more than two confidence levels 524 (e.g., shown in FIG. 5A as a three level configuration—low, medium, and high).

Referring further to FIG. 5A, the DLM 500 also includes the viewer 530. The viewer 530 is configured to generate or to render a graphical representation of the confidence for a data record 402. Here, the graphical representation of the confidence for the data record 402 is referred to as a view 532. The view 532 may include one or more sections 534 where each section 534 conveys an aspect of how the distributed network 400 perceives the data record 402. In some examples, the sections 534 includes a first section 534*a* (also referred to a consensus section 534*b*) and a second section 534*b* (also referred to as a node section 534*a*). As mentioned previously, as the data record 402 is consumed or generally exchanged throughout the distributed network 400, the DLM 500 determines the confidence in the data record 402 from the perspective of each computing node 410 that interacts with the data record 402. When the distributed network 400 includes multiple computing nodes 410, it may become difficult to track and understand how the computing nodes 410 perceive the data record 402.

Due to these potential complications, the viewer 530 is configured to dynamically generate a view 532 for each data record 402 that conveys the confidence of each computing node 410 with respect to a particular data record 402. In this regard, as shown in FIG. 5A, the node section 534*a* of the view 532 includes a window or location for each computing node 410 of the distributed network 400 where the confidence (e.g., the confidence level 524) of each computing node 410 is represented. The viewer 530, therefore, maintains this node section 534*a* by generating a depiction of the confidence for a computing node 410 when the generator 520 determines that confidence and updating that depiction when the confidence changes. Additionally or alternatively, the number of nodes 410 depicted in the node section 534*a* may change when more computing nodes 410 join the distributed network 400 (or are removed from the distributed network 400).

Referring specifically to FIG. 5A, the node section 534*a* includes four quadrants where the viewer 530 designates a quadrant to each of the four computing nodes 410*a-d* of the distributed network 400. In this scenario, the generator 520 has only generated the confidence level 524 for the first computing node 410*a* so the node section 534*a* represents that confidence in the first quadrant and displays a "N/A" in the other quadrants to indicate that the confidence is unknown with respect to the other computing nodes 410 at this time. If the generator 520 subsequently determines a confidence for another computing node 410 (e.g., the second computing node 410*b*), the viewer 530 will detect or receive that determined confidence and update the node section 534*a* to represent the change (e.g., from "N/A" to a designated confidence level 524). In some implementations, the viewer 530 receives a message that includes an indication that the confidence for a computing node 410 with respect to a particular data record 402 has changed and the viewer 530 updates the view 532 (e.g., in the node section 534*a* and/or consensus section 534*b*) to reflect the change.

The view 532 generated by the viewer 530 also includes a consensus section 534*b*. The consensus section 534*b* represents a consensus confidence for the data record 402. The consensus confidence refers to a confidence of the data record 402 according to a consensus number of computing nodes 410. Although the consensus number can be set by the DLM 500, generally the consensus number occurs when a majority (half or more) of the computing nodes 410 have designated the data record 402 with a particular confidence.

As an example, with four computing nodes 410, the consensus number is two. Therefore, if any two of the computing nodes reach an agreement as to a confidence (e.g., confidence level 524), the viewer 530 represents that agreed upon confidence as a consensus in the consensus section 534*b*. In the case of FIG. 5A, there currently is not a consensus because the generator 520 has not generated a confidence for a majority of the computing nodes 410. This is why the consensus section 534*b* depicts an "N/A" to indicate the consensus is not available. If, however, the generator 520 generates a confidence level 524 for the second computing node 410*b* with respect to the data record 402 and that confidence level 524 is also a high confidence like the first computing node 410*a*, the viewer 530 would update the consensus section 534*b* to have a consensus of "high confidence." On the other hand, if the generator 520 generates a confidence level 524 for the second computing node 410*b* with respect to the data record 402 and that confidence level 524 is also a low or medium confidence level (e.g., does not match the first confidence level 524 of the first computing node 410a), the consensus would still be indeterminate because two computing nodes 410 have not come to an agreement upon their confidence in the data record 402.

Figure 6:
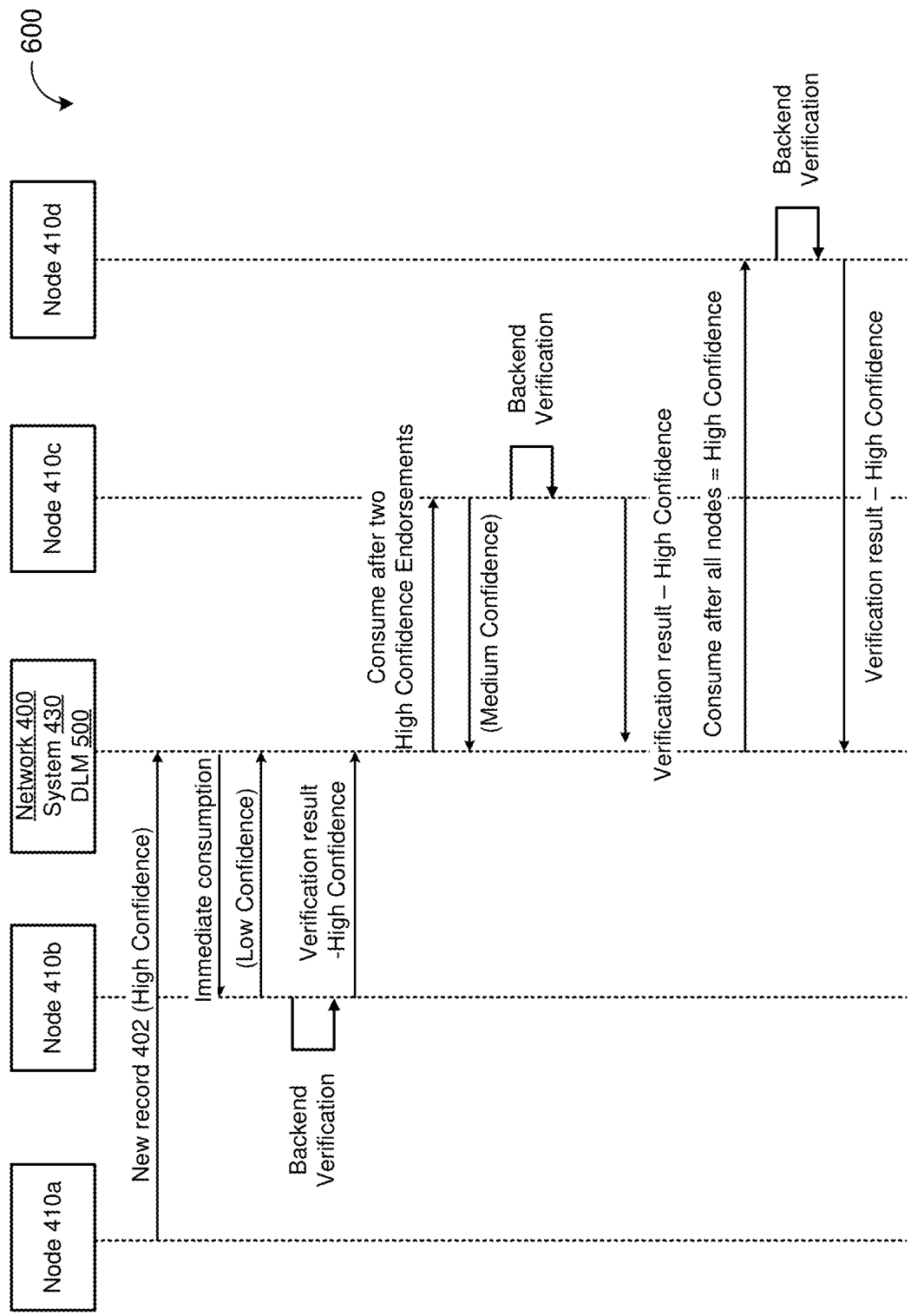
FIG. 6 is a flow diagram of an example data record consumption process for exchanging a data record within the system of FIG. 4.

FIG. 6 is a sequence 600 that illustrates how each of the four computing nodes 410 from FIG. 4 exchange the data record 402. The first computing node 410a provides the data record 402 as a new data record 402 for the distributed network 400. Upon receiving the data record 402 from the first computing node 410a, the DLM 500 generates a confidence level 524 that indicates that the data record 402 with respect to the first computing node 410a has high confidence. The second computing node 410b is configured with a second data consumption protocol 512b that indicates it has high trust and will immediate consume any new data record 402. The consumption coordinator 510 identifies that the consumption condition 514 of the second data consumption protocol 512b has been satisfied and promotes the consumption of the data record 402 by the second computing node 410b.

Due to the immediate consumption of the data record 402 without any verification by the second computing node 410b, the second computing node 410b updates its data record view 532 to indicate that it has low confidence. After some time passes (e.g., a few days), the second computing node 410b verifies the data record 402 and communicates the verification result of high confidence to the distributed network 400 (e.g., the viewer 530 of the DLM 500). By updating the confidence of the data record 402 to reflect a high confidence level 524 from two different computing nodes 410a, 410b, the coordinator 510 determines that the third data consumption protocol 512c has been satisfied. That is, as shown in FIG. 6, the third data consumption protocol 512c includes a consumption condition 514 that more than one computing node 410 has designated the data record 402 as high confidence. In other words, the consumption condition 514 of the third data consumption protocol 512c is dependent upon the confidence of other computing nodes 410 (e.g., needs at least two computing nodes indicating high confidence).

In determining that the consumption condition 514 of the third data consumption protocol 512c is satisfied, the coordinator 510 promotes the consumption of the data record 402 by the third computing node 410c. Originally, when the third computing node 410c consumes the data record 402, the generator 520 determines that the confidence for the third computing node 410c with respect to the data record 402 is medium confidence because the third computing node 410c has not performed verification of the data record 402 (e.g., the verification with respect to the third computing node 410c is stale/non-existent). After a few days, the backend of the third computing node 410c verifies the data record 402 and communicates the verification result to the distributed network 400. The distributed network 400 receives the verification result for the data record 402 and updates the confidence of the data record 402 for the third computing node 410c to be high confidence.

With the third computing node 410c having a high confidence in the data record 402, the consumption coordinator 510 determines that, by all other computing nodes 410 besides the fourth computing node 410d having high confidence in the data record 402, the consumption condition 514 of the fourth data consumption protocol 512d is satisfied. In other words, the consumption condition 514 of the fourth data consumption protocol 512d is low to no trust and requires that all other nodes have high confidence in the data record 402 as the consumption condition 514. By determining that the consumption condition 514 for the fourth computing node 410d has been satisfied (e.g., by the consumption coordinator 510), the fourth computing node 410d consumes the data record 402, verifies the data record 402, and communicates a verification result. The generator 520 receives the verification result from the fourth computing node 410d and determines that the fourth computing node 410d has high confidence with respect to the data record 402. The viewer 530 detects this high confidence generated by the generator 520 and updates the view 532 of the data record 402 to represent that the fourth computing node 410d has this high confidence in the data record 402.

Figure 7:
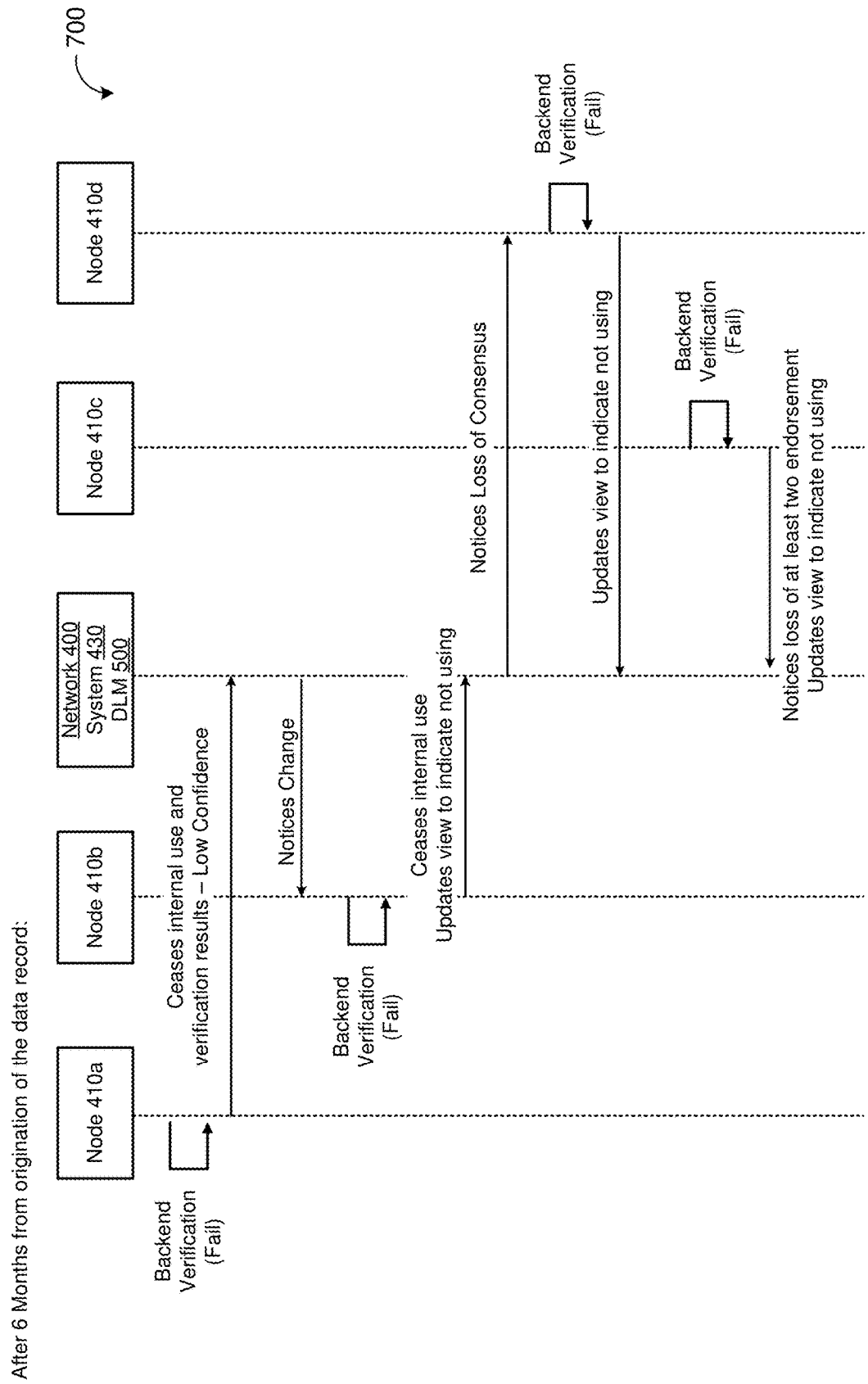
FIG. 7 is a flow diagram of an example process for ceasing use of the data record from FIG. 6 within the systems of FIG. 4.

FIG. 7 is another process 700 for the same data record 402 of FIG. 6. In this process 700, there is a cascading effect due to the fact that the first computing node 410a fails to verify the data record 402. A node 410, like the first computing node 410a, may be configured to periodically audit or verify a data records 402 that it is using. After six months from the origination of the data record 402, the first computing node 410a tries to verify the data record 402 and fails. Due to this failure, the first computing node 410a ceases internal use of the data record 402 and communicates the verification results to the distributed network 400. With the results, the generator 520 determines that the first computing node 410a has low confidence in the data record 402 causing the viewer 530 to update the view 532 for the data record 402 (e.g., the node section 534a).

In this example, the second computing node 410b notices the change to the view 532 for the data record 402 and initiates its own verification process for the data record 402. The second computing node 410b is likewise unable to verify the data record 402 and ceases its internal use of the data record 402. As part of the cessation, the second computing node 410b communicates the failed verification results to the distributed network 400 and the generator 520 downgrades the confidence level 524 for the data record 402 by the second computing node 410b. Detecting this change, the viewer 530 accordingly updates the view 532 to represent the change in confidence for the second computing node 410b.

Since the confidence has changed for both the first and second computing node 410a, 410b, the fourth computing node 410d recognizes these changes and attempts to verify on its backend. This verification fails and, in response to this verification failure, the fourth computing node 410d stops using the data record 402 and has its view 532 updated to indicate that the fourth computing node 410d is not using the data record 402.

The third computing node 410c notices activity regarding the data record 402 (e.g., by determining that its consumption condition 514 is no longer satisfied) and proceeds to attempt its own backend verification. Like the other nodes 410, this verification process fails and the third computing node 410c ceases to use the data record 402. Accordingly, the viewer 530 updates the view 532 of the record 402 to indicate this lack of use. With this process 700, the computing nodes 410 of the distributed network 400 were able to recognize changes to the confidence of the data record 402 and/or changes to the viewer 530. By this recognition, the nodes 410 were able to efficiently modify their use of the data record 402 to match how the veracity of the data record 402 evolved.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements as well as an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set—in other words, in some circumstances a "set" may have zero elements. The term "non-empty set" may be used to indicate exclusion of the empty set—in other words, a non-empty set will always have one or more elements. The term "subset" does not necessarily require a proper subset. In other words, a "subset" of a first set may be coextensive with (equal to) the first set. Further, the term "subset" does not necessarily exclude the empty set—in some circumstances a "subset" may have zero elements.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module."

The term "module" may refer to, be part of, or include processor hardware (shared, dedicated, or group) that executes code and memory hardware (shared, dedicated, or group) that stores code executed by the processor hardware.

The module may include one or more interface circuit(s). In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A system comprising:
 data processing hardware; and
 memory hardware, wherein the memory hardware is configured to store instructions that, when executed by the data processing hardware, cause the data processing hardware to perform operations that include:
 permitting a first computing node to join a distributed network having a persistent storage system, wherein:
  each computing node within the distributed network is assigned a data consumption protocol that indicates how the computing node consumes a data record from the persistent storage system, and
  the distributed network supports a plurality of data consumption protocols;
 receiving, at the persistent storage system, a first data record from the first computing node having a first data consumption protocol;
 in response to receiving the first data record, determining a first confidence level for the first data record from a set of confidence levels based on the first data consumption protocol, wherein:
  the first confidence level represents a level of veracity of the first data record for use by the first computing node,
  the first confidence level is determined based on a first confidence score, and
  the first confidence score is based on a credibility of a provider of the first data record;
 providing the first data record to a second computing node based on a second data consumption protocol assigned to the second computing node;
 in response to providing the first data record to the second computing node, determining a second confidence level for the first data record from the set of confidence levels based on the second data consumption protocol, wherein the second confidence level represents the level of veracity of the first data record for use by the second computing node; and
 updating a view associated with the persistent storage system and accessible to each computing node within the distributed network to indicate the first confidence level and the second confidence level for the first data record.

2. The system of claim 1, wherein the first data consumption protocol includes a condition for data record consumption that is different than the second data consumption protocol.

3. The system of claim 1, wherein the second data consumption protocol indicates that the second computing node obtains a data record from the persistent storage system automatically upon ingestion of the data record at the persistent storage system.

4. The system of claim 3, wherein the second confidence level indicates that the second computing node did not verify the first data record upon receipt of the first data record.

5. The system of claim 3, wherein the operations further include:
 receiving a message from the second computing node that indicates a verification result from the second computing node about the first data record;
 determining that the verification result indicates that the second confidence level has changed; and
 updating the second confidence level to represent a confidence indicated by the verification result.

6. The system of claim 1, wherein each respective confidence level of the set of confidence levels includes a respective confidence threshold that delineates a boundary for the respective confidence level.

7. The system of claim 1, wherein the first confidence level and the second confidence level are equivalent.

8. The system of claim 1, wherein the operations further include generating the first confidence score based on a set of characteristics of the first data record and the credibility of the provider of the first data record.

9. The system of claim 8, wherein determining the first confidence level includes determining whether the first confidence score for the first data record satisfies a confidence threshold.

10. The system of claim 8, wherein the set of characteristics includes an indication of freshness for data information included in the first data record.

11. The system of claim 8, wherein the credibility of the provider of the first data record is based on a dynamically changing reliability rating for the provider of the first data record.

12. The system of claim 1, wherein providing the first data record to the second computing node is also based on the first confidence level for the first data record.

13. The system of claim 1, wherein providing the first data record to the second computing node is also based on the first confidence level satisfying a consumption condition defined by the second data consumption protocol.

14. The system of claim 13, wherein the first confidence level satisfies the consumption condition when the first confidence level corresponds to one of a subset of one or more confidence levels from the set of confidence levels.

15. The system of claim 1, wherein the operations further include, in response to the second confidence level satisfying a confidence threshold associated with the respective confidence level, providing the first data record to a third computing node based on a third data consumption protocol assigned to the third computing node.

16. The system of claim 15, wherein the third data consumption protocol includes a condition that at least two computing nodes have confidence levels that satisfy the confidence threshold.

17. The system of claim 1, wherein the view includes a section that represents a consensus confidence for the first data record.

18. The system of claim 17, wherein the operations further include:
- determining the consensus confidence for a consensus of computing nodes within the distributed network; and
- updating the section to represent the consensus confidence for the first data record.

19. A computerized method comprising:
- permitting a first computing node to join a distributed network having a persistent storage system, wherein:
  - each computing node within the distributed network is assigned a data consumption protocol that indicates how the computing node consumes a data record from the persistent storage system, and
  - the distributed network supports a plurality of data consumption protocols;
- receiving, at the persistent storage system, a first data record from the first computing node having a first data consumption protocol;
- in response to receiving the first data record, determining a first confidence level for the first data record from a set of confidence levels based on the first data consumption protocol, wherein:
  - the first confidence level represents a level of veracity of the first data record for use by the first computing node,
  - the first confidence level is determined based on a first confidence score, and
  - the first confidence score is based on a credibility of a provider of the first data record;
- providing the first data record to a second computing node based on a second data consumption protocol assigned to the second computing node;
- in response to providing the first data record to the second computing node, determining a second confidence level for the first data record from the set of confidence levels based on the second data consumption protocol, wherein the second confidence level represents the level of veracity of the first data record for use by the second computing node; and
- updating a view associated with the persistent storage system and accessible to each computing node within the distributed network to indicate the first confidence level and the second confidence level for the first data record.

20. A non-transitory computer-readable medium comprising instructions including:
- permitting a first computing node to join a distributed network having a persistent storage system, wherein:
  - each computing node within the distributed network is assigned a data consumption protocol that indicates how the computing node consumes a data record from the persistent storage system, and
  - the distributed network supports a plurality of data consumption protocols;
- receiving, at the persistent storage system, a first data record from the first computing node having a first data consumption protocol;
- in response to receiving the first data record, determining a first confidence level for the first data record from a set of confidence levels based on the first data consumption protocol, wherein:
  - the first confidence level represents a level of veracity of the first data record for use by the first computing node,
  - the first confidence level is determined based on a first confidence score, and
  - the first confidence score is based on a credibility of a provider of the first data record;
- providing the first data record to a second computing node based on a second data consumption protocol assigned to the second computing node;
- in response to providing the first data record to the second computing node, determining a second confidence level for the first data record from the set of confidence levels based on the second data consumption protocol, wherein the second confidence level represents the level of veracity of the first data record for use by the second computing node; and
- updating a view associated with the persistent storage system and accessible to each computing node within the distributed network to indicate the first confidence level and the second confidence level for the first data record.

* * * * *